United States Patent [19]
Cosentino

[11] 4,085,181
[45] Apr. 18, 1978

[54] PROCESS FOR PREPARING SLABS OF BUILDING MATERIALS

[76] Inventor: Edward A. Cosentino, 2100 S. Ocean La., Apt. No. 1707, Fort Lauderdale, Fla. 33316

[21] Appl. No.: 523,702

[22] Filed: Nov. 14, 1974

Related U.S. Application Data

[63] Continuation of Ser. No. 145,725, May 21, 1971, abandoned.

[51] Int. Cl.² .......................... B29D 3/00; B29D 7/18; B29D 23/08
[52] U.S. Cl. .................................. 264/158; 264/245; 264/250; 264/255; 264/271; 264/275; 264/279; 264/338
[58] Field of Search ............... 264/118, 131, 261, 245, 264/247, 271, 71, 73, 259, 157, 250, 255, 160, 145, 338, 158, 275, 279

[56] References Cited

U.S. PATENT DOCUMENTS

| | | | |
|---|---|---|---|
| 2,999,780 | 9/1961 | Perrault | 264/311 |
| 3,039,148 | 6/1962 | Pratt et al. | 264/255 |
| 3,097,080 | 7/1963 | Weir | 264/261 |
| 3,150,032 | 9/1964 | Rubenstein | 264/271 |
| 3,232,017 | 2/1966 | Prusinski et al. | 264/247 |
| 3,247,299 | 4/1966 | Zaha | 264/158 |
| 3,303,245 | 2/1967 | Trudeau | 264/145 |
| 3,324,213 | 6/1967 | Anfinset | 264/255 |
| 3,649,352 | 3/1972 | Courneya | 264/1 |
| 3,770,690 | 11/1973 | Oswitch et al. | 264/338 |
| 3,832,264 | 8/1974 | Barnette | 264/247 |

OTHER PUBLICATIONS

Arkhangelskyii et al., Fiberglass Boat Building, Dept. Commerce, Wash., D.C. (1964) pp. 81 & 82.

*Primary Examiner*—Willard E. Hoag
*Attorney, Agent, or Firm*—Lane, Aitken, Dunner & Ziems

[57] ABSTRACT

Method of making slabs of building material which can be used in place of slabs of compact marble are prepared by lining at least one surface of a mold with bonding material, introducing into the mold pieces of solid material to form an aggregate of individual pieces of said solid material with interstices therebetween, filling these interstices with bonding material which chemically bonds to the bonding material utilized for lining, allowing the bonding material to cure and harden to form a solid block of lined material, removing the solid block of lined material from the mold and slicing said block to desired size.

7 Claims, 6 Drawing Figures

PROCESS FOR PREPARING SLABS OF BUILDING MATERIALS

BACKGROUND OF THE INVENTION

This is a continuation, of application Ser. No. 145,725 filed May 21, 1971 now abandoned.

This invention relates to the production of slabs of building material and to the slabs so formed. These slabs can be used in place of slabs of compact marble.

Italian Pat. No. 13432/65 to Toncelli Marcello describes a process for preparing slabs of building material by introducing pieces or chips of marble into a mold, filling the interstices between the chips in the mold with a mixture of marble dust and fast hardening polyester resin, allowing the resin to harden so as to form a composite block, removing the block from the mold, and then cutting the block into slabs and polishing the slabs. The end product is said to be substitutable for slabs of compact marble. Because no surface of the end product blocks is lined, they have the deficiency that often their exposed surfaces are damaged or chipped as a result of slicing or grinding during slab formation. In other words, the exposed surfaces of the slabs so formed are often scarred or else cannot be accurately sized to a predetermined size.

Methods for preparing lined building materials are also known. For example, Zaha U.S. Pat. No. 3,247,299 describes a method of making precast terrazzo tile by forming an admixture of marble chips and cement, curing said admixture to form a composite block, and adhering to said block a thin coating or layer of flexible material such as cardboard or fused polyvinyl chloride. This method is deficient because during slabbing utilizing the conditions of high speed cutting required to cut stone, the lining tends to be torn away from the mixture of chips and cement as a result of the cutting blades utilized for slabbing. Thus, often a finished product material is prepared by this method with a ripped lining whereby the advantages that might accrue from such lining are negated.

It is an object of the present invention to produce a marble-substitutable building material lined with a material that is not removed during cutting or grinding whereby there is produced a slab of building material having a surface which is not chipped or otherwise scarred and which is formed in accordance with predetermined precise dimensions so that slabs can be placed side-by-side without even a hairline joint.

SUMMARY OF THE INVENTION

In accordance with the present invention, the above object is achieved and the deficiencies of the cited prior art are overcome by a process wherein the lining material is prepared from a bonding material which chemically bonds to bonding material which is used as matrix material to form the main body of the building material so that the lining material is not removed or otherwise altered during cutting or grinding.

In other words, in the present process a solid slab of conglomerate building material is formed by a process comprising the steps of (a) providing a molding zone; (b) providing at least one surface of said molding zone with a lining of bonding material; (c) filling said molding zone adjacent said lining with pieces of solid material to form an aggregate of individual pieces of solid material with interstices therebetween; (d) filling said interstices with bonding material which chemically bonds to the bonding material utilized for lining; (e) allowing said bonding material to harden and cure to form a lined composite consisting of a matrix of hardened bonding material having embedded therein pieces of solid material, at least one surface of said matrix being lined with and chemically bonded to said lining; (f) removing the resulting lined composite from said molding zone; and (g) cutting said composite to provide the desired-size slab.

DETAILED DESCRIPTION OF THE INVENTION

Figure 2:
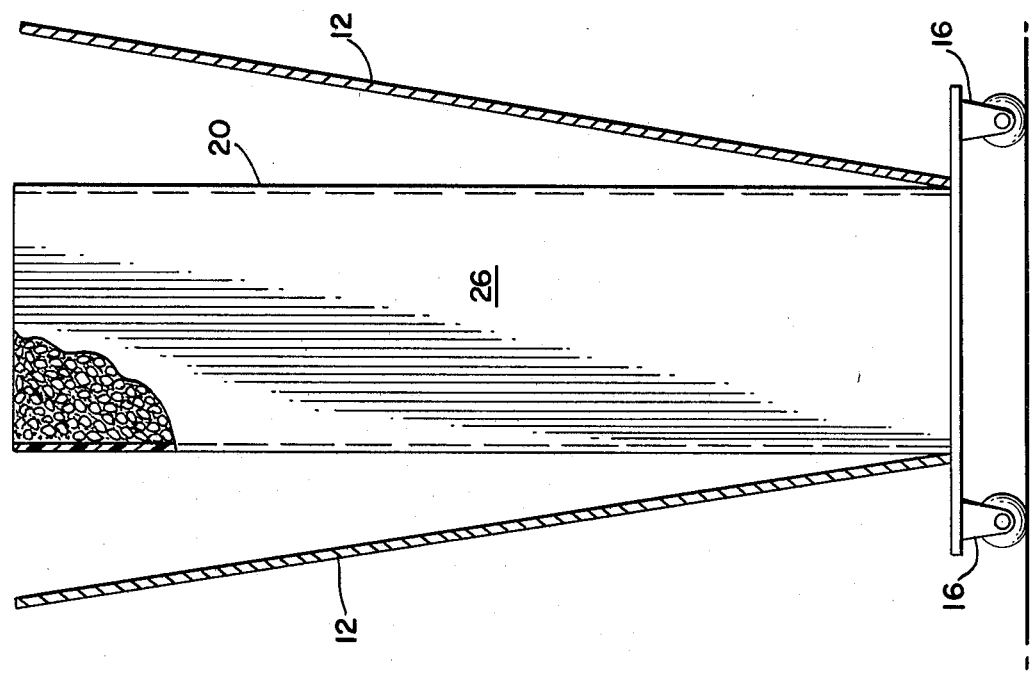
FIG. 2 is a view of the mold of FIG. 1 with the front wall removed so as to depict the lined composite of the present invention.
Figure 1:
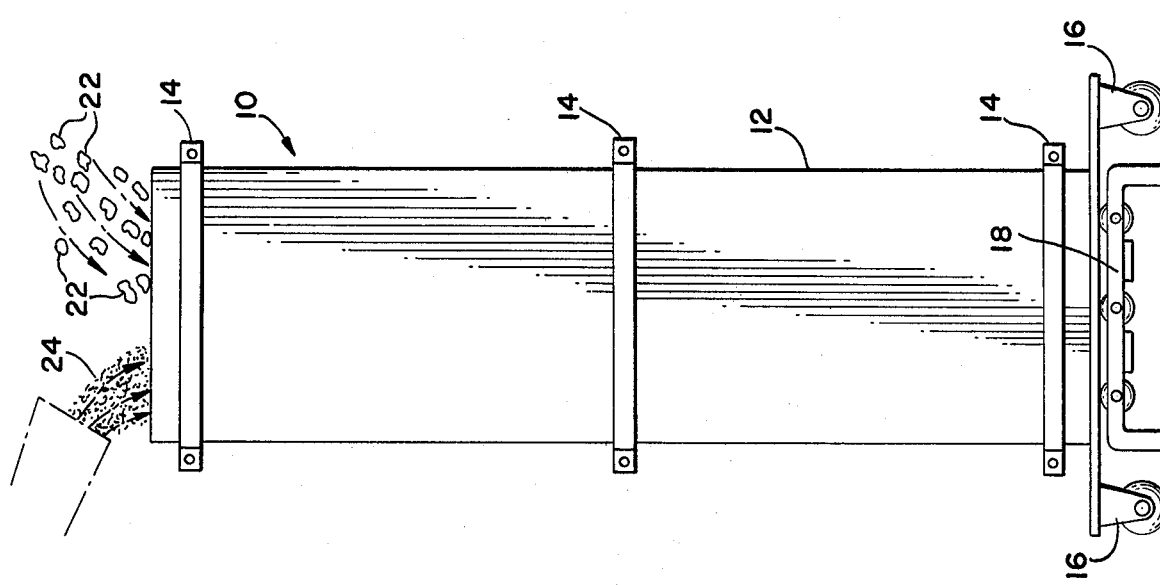
FIG. 1 is an elevational view of a mold utilized for the process of the present invention.

With continuing reference to FIGS. 1–6, a molding zone is provided by a mold 10 having removable sidewalls 12 held in place by flasks 14. The mold 10 is disposed on a trolley 16 which is contiguous with a vibrator 18.

The sidewalls 12 are lined with bonding material to provide linings 20. The mold 10 is then filled with pieces of solid material 22. The interstices between the pieces of solid material 22 are then filled in with bonding material 24. The vibrator 18 is utilized to aid in filling the bonding material into the interstices. After the interstices have been filled, the bonding material 24 is cured to provide within the mold a lined composite 26.

Figure 3:
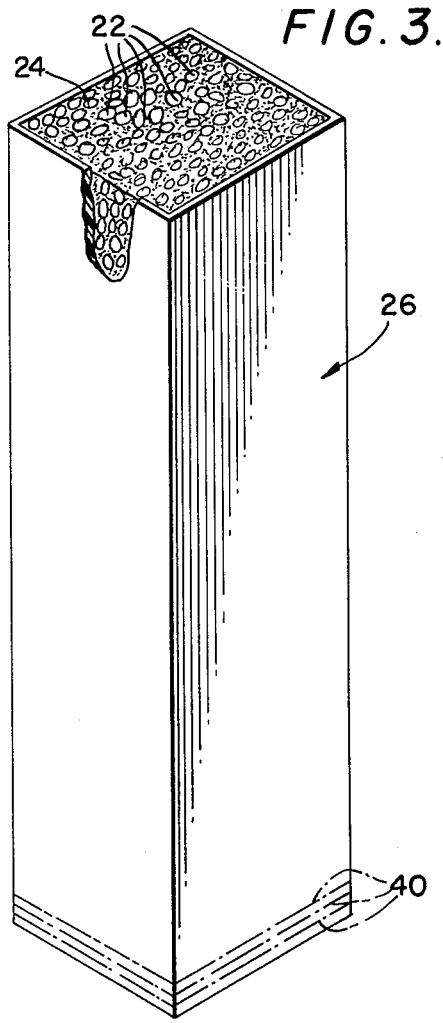
FIG. 3 is a perspective view of the lined composite removed from the mold.
Figure 4:
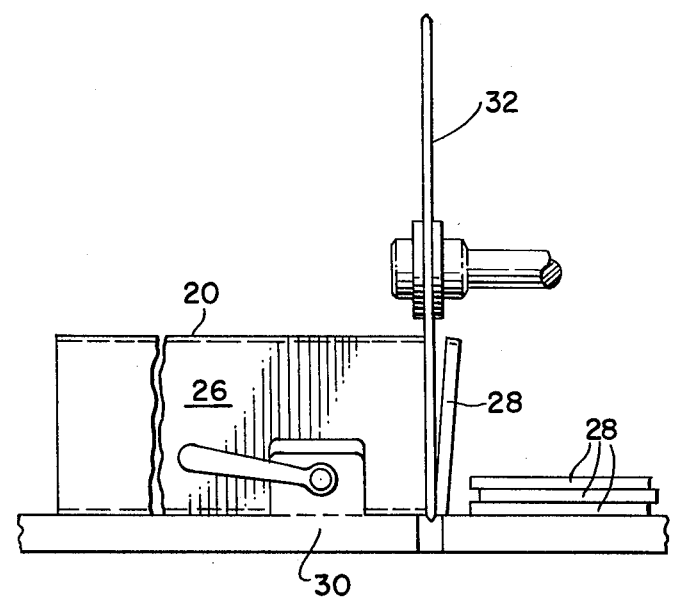
FIG. 4 is an elevational view of the slab cutting process.
Figure 5:
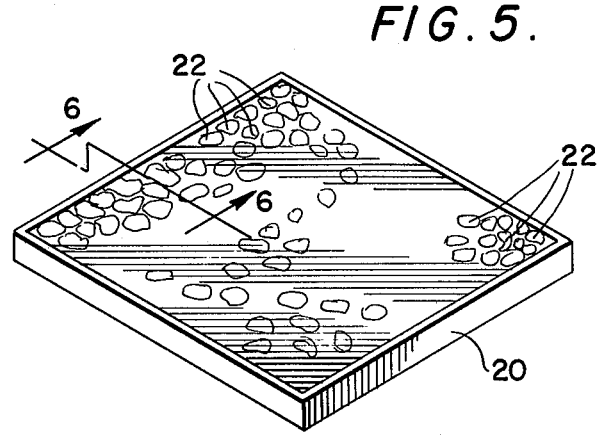
FIG. 5 is a perspective view of a slab produced by the cutting process of FIG. 4.
Figure 6:
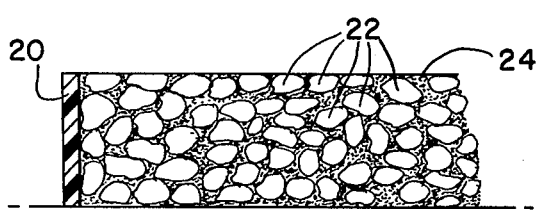
FIG. 6 is an enlarged fragmentary cross-section taken along line 6—6 of FIG. 5.

The sidewalls 12 are then removed to expose the lined composite 26. The removed lined composite is depicted in FIG. 3. Slabs 28 are then cut from lined composite 26 utilizing a stone cutting machine depicted in FIG. 4. During cutting the line composite 26 is held in place by a clamp 30. Slabs 28 are cut utilizing blade 32. A cut slab 28 lined about its periphery with lining 20 so as to have precise dimensions is depicted in FIG. 5 with the cross-section of this slab depicted in FIG. 6.

The molding zone can be of any configuration but preferably has at least one flat surface. For example, the molding zone can be prismatic in configuration or conical or cylindrical. The molding zone can be any mold of the type ordinarily utilized for preparing cast building materials. Preferably, the molds are vertically oriented with a square horizontal cross-section so that preformed rectangular linings can be inserted contiguous with the mold sidewalls. Preferably, the molds have an opening at the top so that the material can be introduced into this opening.

The lining for the molding zone, whether for one surface or a multiplicity of surfaces, is preferably premolded to fit the surface or surfaces of the molding zone which it is to line. This premolding is carried out, for example, by pouring bonding material containing a suitable curing catalyst into a premolding zone and allowing this bonding material to cure or harden in this premolding zone to form a solid lining of said bonding material which is then introduced and fitted into said molding zone at a predetermined proper location where it will function to protect the surface of the composite to be formed adjacent and bonded thereto.

If a lining is to be formed to fit the bottom surface of the molding zone, it can be formed directly in the molding zone. A lining for the bottom surface of the molding zone need not be cured, that is, hardened preliminary to the addition of the matrix bonding material and pieces of hard material, but preferably is.

The bonding material for the lining (sometimes referred to herein as "lining bonding material") can be any bonding material which hardens to provide a solid sheet and which chemically bonds to the matrix bonding material. Preferably, the bonding material for the lining is a fast-hardening resin bonding material. Commercially available resin bonding materials include polyester resins and epoxy resins.

Resin bonding materials when obtained commercially are in viscous liquid form. They are obtained in combination with curing, that is, cross-linking, catalysts which are admixed therewith so as to fast-harden said resins into solid state. The curing catalysts are rated according to the time period they take to harden the resin into solid state. Ordinarily these catalysts actuate the resin to harden into solid state within a time period ranging from 1 hour to 5 hours; an especially useful catalyst is rated to achieve hardening within 3 hours.

Up to about 35% by weight of the bonding material, including catalyst, in the lining can be replaced with solid material dust as defined hereinafter. Thus, the lining can comprise by weight about 65% to 100% bonding material including curing catalyst and from 0% to 35% solid material dust. Preferably, the lining comprises about 80% to 90% by weight bonding material including curing catalyst and about 10 to 20% by weight solid material dust. The lining can also contain suitable dyes so as to color it to any desired color. For example, titanium dioxide can be utilized as a dye ingredient if a lining is to be colored white. The dust or dye ingredients, if any, are admixed with bonding material and curing catalyst previous to the forming of the lining, for example, in any convenient mixer. This admixture is then poured into the premolding zone or into a portion of the molding zone where it is allowed to harden to solid state in accordance with the rating of the catalyst so used.

Preferably, all the side walls of the mold are lined so that the entire periphery of a finished product slab is precisely dimensioned.

Once the lining is in place in the molding zone, pieces of solid material are introduced into the molding zone adjacent to the surface or surfaces of the molding zone which have been lined. Preferably, the solid material is stone. As used herein, the term "stone" means any concretion of earthy or mineral matter. Thus, the term stone includes random marble, onyx, travertine, granite, quartzite or other common building material. Other solid materials can be utilized as long as they are relatively hard. For example, pieces of synthetic materials can be utilized, such as polyvinyl chloride chips. The amount of solid material pieces utilized ranges from about 70% to 80% by weight of the composite portion, that is, on a lining-free basis of the lined composite which is being prepared.

The pieces of solid material generally have sizes defined by an equivalent diameter ranging from about ⅜ inch to 12 inches. The term "equivalent diameter" is utilized herein to mean the diameter of a sphere-shaped piece of solid material displacing the same volume as the piece of solid material being measured.

Once the stones have been filled into the mold to form an aggregate of individual pieces of solid material with the interstices therebetween, the interstices are filled in with bonding material. This bonding material is referred to herein as "matrix bonding material."

The matrix bonding material can be any bonding material which hardens to provide a solid matrix and which chemically bonds to the lining bonding material. Preferably, the matrix bonding material is a fast-hardening resin bonding material such as a polyester resin or epoxy resin. These fast-hardening resin bonding materials are used in combination with curing catalysts and have been defined hereinbefore in the description of the lining bonding materials. Preferably, the same bonding material is utilized for the lining bonding material as is used for the matrix bonding material.

As with the lining bonding material, up to about 35% of the matrix bonding material can be replaced with solid material dust. The term "solid material dust" is used herein to mean dust resulting from comminuted or otherwise size-reduced solid material as defined hereinbefore. It includes solid material dust formed directly by synthetic methods. The matrix bonding material may be admixed with the same percentage or different percentage of solid material dust as the lining bonding material.

The matrix bonding material or combination of matrix bonding material and solid material dust can simply be poured by any convenient method, for example, by means of a ladle, into the molding zone so as to flood the interstices between the pieces of solid material therein. The molding zone is preferably vibrated during this pouring process so that all of the interstices or essentially all of the interstices will be filled by the bonding composition. Once the matrix bonding material has been added into the interstices, it is cured and hardened, whereby there is formed a composite in which the hardened matrix bonding material acts as a matrix holding together the pieces of solid material and in which the hardened matrix bonding material is attached and chemically bonded to the lining. If the lining bonding material has not been hardened prior to the introduction of the matrix bonding material, it is cured and hardened at the same time that the matrix bonding material is. Thus, curing and hardening is carried out in accord with the procedure previously mentioned with respect to the curing and hardening of the lining.

The lined composite on a lining-free basis comprises by weight from about 20% to 30% hardened matrix including curing catalyst and solid material dust.

The curing and hardening, either here or in the case of the lining, can be accelerated by the application of heat to the molding zone or to the premolding zone, for example, in an oven utilizing temperatures ranging from about 140° F. to 180° F. Once the lined composite has hardened to the required degree, it is removed from the molding zone, for example, by removal of side walls of the mold. It then can be sliced into slabs of desired dimension by the use of conventional stone cutting equipment, for example, utilizing cutting blades having speeds ranging from about 1,000 to 2,000 rotations per minute, preferably from about 1,200 to 1800 rotations per minute, with water being utilized as a coolant.

The slabs so formed are useful as building materials. They are not deformable. They are impermeable to water or dampness. They are warp-proof. Moreover, due to the lining, the lining surface is unscarred and unchipped and is formed in accordance with a precise predetermined dimension. Because of the nature of the lining, it is not torn or otherwise removed from the composite during cutting or slicing of the lined composite into slabs.

The present invention is further illustrated in the following example, wherein a lined composite within the scope of the invention is prepared.

EXAMPLE

A vertically oriented rectangular parallelpiped shaped mold of the same configuration as the mold depicted in FIG. 3 is provided. The mold has dimensions of 1 foot by 1 foot by 6 feet. The bottom surface is 1 foot by 1 foot square. The mold is enclosed on all sides except for the top, where it is open. Each of the four side walls is rectangular in shape with dimensions of 1 foot by 6 feet. A one-eighth-inch-thick lining is prepared for each side wall of the mold. Each lining is prepared by pouring a stone dust-polyester resin bonding mixture into another mold, that is, into a premold. The dust-polyester resin mixture poured into the premold contains by weight 15% dust and 85% polyester resin. The polyester resin contains a 3-hour catalyst. The stone dust is derived from marble; it is white in color. After the pouring is carried out, each poured lining is allowed to cure and harden for 3 hours. After a 3-hour hardening period is completed, the formed lining is removed from the premold and fitted along a sidewall of the mold. Each lining is white in color.

Into the opening of the mold are then poured about 600 lbs. of assorted stone chips. The total mass of stone chips contains by weight 50% chunk chips having equivalent diameters ranging from 12 inches to 3 inches, 25% No. 8 size chips having equivalent diameters ranging from 2⅛ inches to 1-½ inches and 25% No. 1 size chips having equivalent diameters ranging from 1¼ inches to ⅜ inches. These different types of stones are uniformly admixed before they are introduced into the mold. The particular type of stone chips utilized herein are random marble chips.

Into the interstices between the stones is then poured a bonding composition having the same composition as that bonding composition utilized for the facing material; in other words, this bonding composition is composed of 85% by weight polyester resin with a 3-hour catalyst and 15% marble dust. As the bonding composition is being poured into the interstices by the use of a ladle, the molding zone is vibrated so that essentially all of the interstices are filled in.

Once the interstices have been filled in with the bonding material, the bonding material is allowed to harden and cure for 3 hours. At the conclusion of this 3-hour period, there is formed within the mold a block of lined composite (1 foot by 1 foot by 6 feet) which is made up of a lining of solidified bonding material along each 1-foot by 6-feet side surface which is bonded to a matrix of the same bonding material which surrounds and holds together the assorted chips. The formed lined composite contains 80% stone chips by weight of the composite portion (that is, without consideration of the lining) and 20% by weight bonding composition (resin and stone dust) by weight of the composite portion of the lined composite. The dust component amounts to 3% by weight of the composite portion of the lined composite and the polyester resin amounts to 17% by weight of the composite portion of the lined composite. The lining appears white in color. It is smooth and slick and contains a sheen. There is essentially no variation in the surface dimension of the lined composite in the lining portion thereof.

The block of lined composite having been removed from its mold is then subjected to cutting into slabs along score lines (depicted in FIG. 3 as lines 40) utilizing a stone cutter manufactured by Tysaman Corporation with cutting blades turning at 1600 rpm with water utilized as coolant. The slabs so formed are 1 foot square by any desired number of inches thick. The cutting process does not disturb or chip in any way the lining portion of the slab. The slabs are conveniently used for tile for flooring and are substitutes for slabs of compact marble.

The invention may be embodied in other specific forms without departing from the spirit or essential characteristics thereof. For example, epoxy resin can be substituted for the polyester resin utilized above with equal results of precisely dimensioned slabs wherein the linings are not disturbed during the cutting step.

The present embodiments are therefore to be considered in all respects as illustrative and not restrictive, the scope of the invention being indicated by the appended claims rather than by the foregoing description, and all changes that come within the meaning and range of equivalency of the claims are therefore intended to be embraced therein.

I claim:

1. A process for preparing a slab of conglomerate building material, said process comprising the steps of (a) providing an elogated mold; (b) forming a premolded resin liner on at least one surface of said elongated mold with a lining material; (c) filling said mold adjacent said liner with pieces of solid material to form an aggregate of individual pieces with interstices therebetween; (d) filling said interstices with bonding material which chemically bonds to the liner and also bonds to the filling material; (e) causing said bonding material to cure and harden to form a lined composite consisting of matrix of hardened bonding material which is sufficiently elongated to permit a plurality of slabs to be cut transversely from said matrix, said matrix having embedded therein peices of solid material, at least one surface of said matrix being lined with and chemically bonded to said liner so that said liner forms an elongated outer surface of said matrix which is not removed from said matrix or otherwise altered when said matrix is cut transversely to the elongated surface of the liner to produce a slab of building material; (f) removing the resulting lined composite from said mold; (g) cutting said elongated matrix and said liner transversely to said elongated surface to form a slab of building material having at least one outer edge surface which is not chipped or otherwise scarred, which has precise dimensions and which edge surface comprised a portion of the outer surface of the liner before the slab was cut; and (h) repeating said cutting step at least once to produce a plurality of said slabs from a single elongated matrix.

2. The process of claim 1 wherein up to about 35% by weight of the bonding material in the matrix is replaced with stone dust.

3. The process of claim 1 wherein the solid material is stone.

4. The process of claim 3 wherein the pieces of stone are selected from the group consisting of random marble, onyx, travertine, granite and quartzite.

5. The process of claim 1 wherein the bonding material for the lines is the same as the bonding material for the matrix.

6. The process of claim 5 wherein the bonding material for both the matrix and the lines is polyester resin.

7. The process of claim 5 wherein the polyester resin bonding material contains a curing catalyst which actuates the resin to harden into solid state within a time period ranging from 1 hour to 5 hours.

* * * * *